Nov. 27, 1945.   T. J. STEPHENS   2,389,650
APPARATUS FOR ROASTING COFFEE AND THE LIKE
Filed Aug. 7, 1942   4 Sheets-Sheet 1
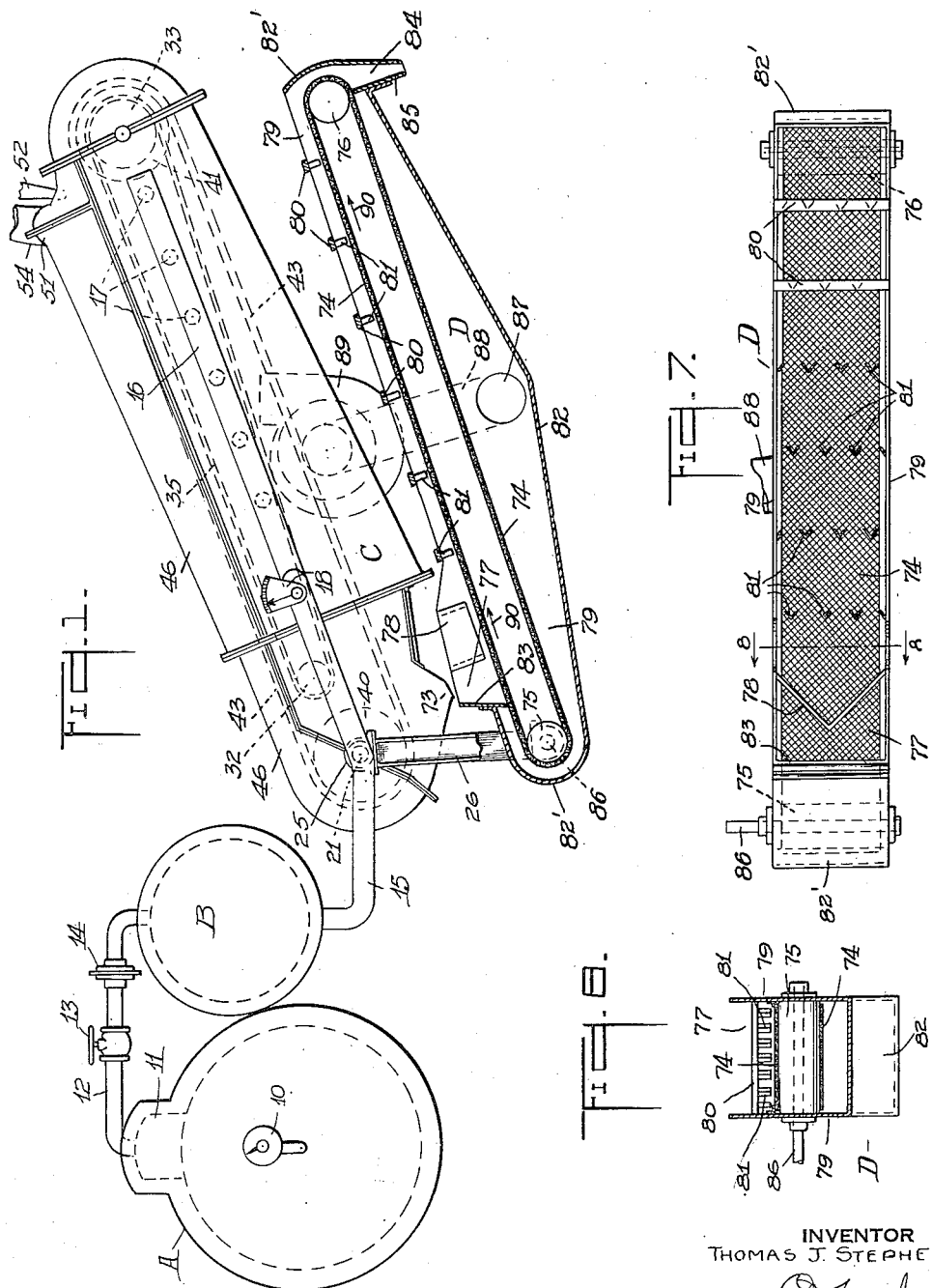
INVENTOR
THOMAS J. STEPHENS
BY
ATTORNEY

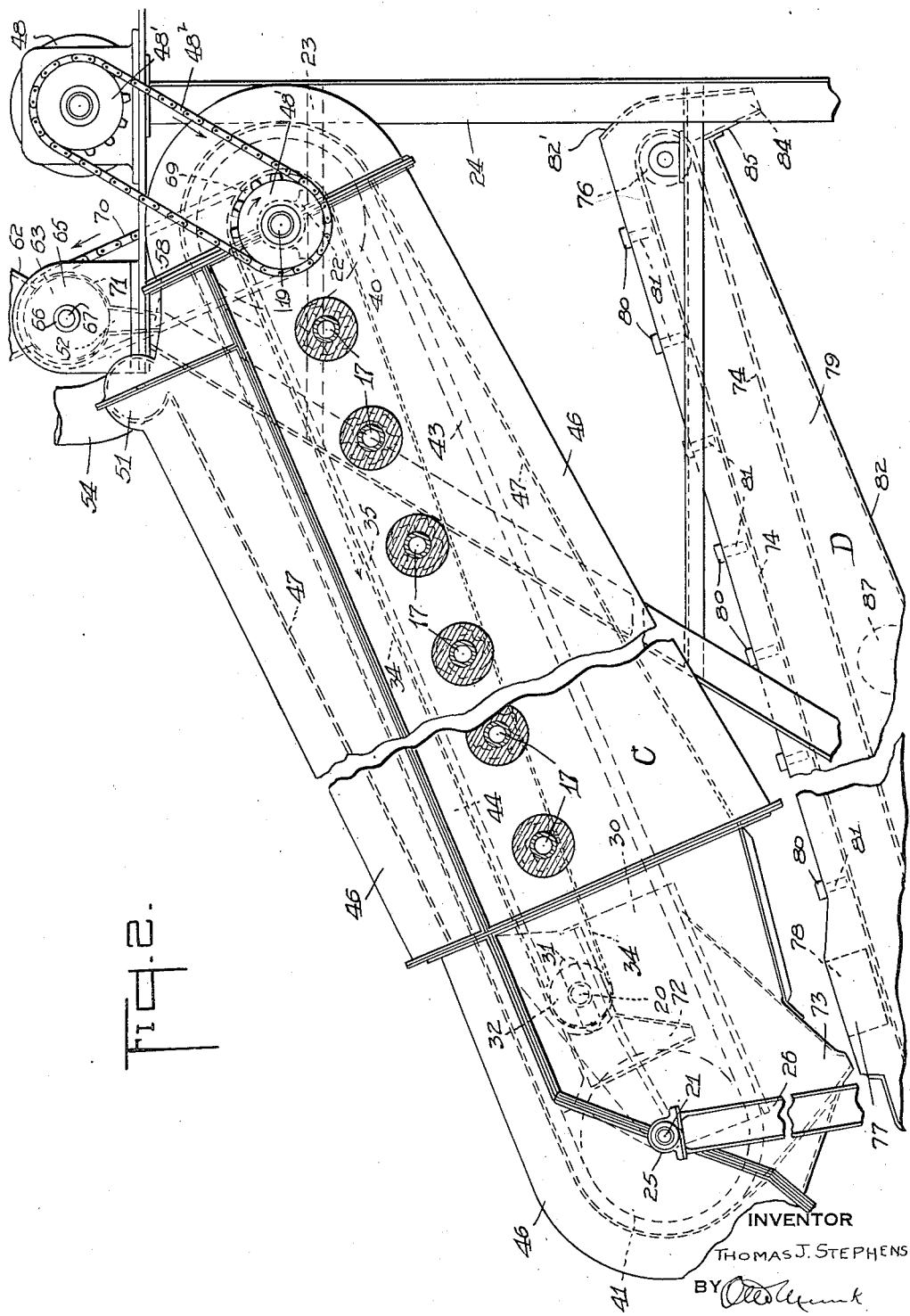

Nov. 27, 1945. T. J. STEPHENS 2,389,650
APPARATUS FOR ROASTING COFFEE AND THE LIKE
Filed Aug. 7, 1942 4 Sheets-Sheet 3
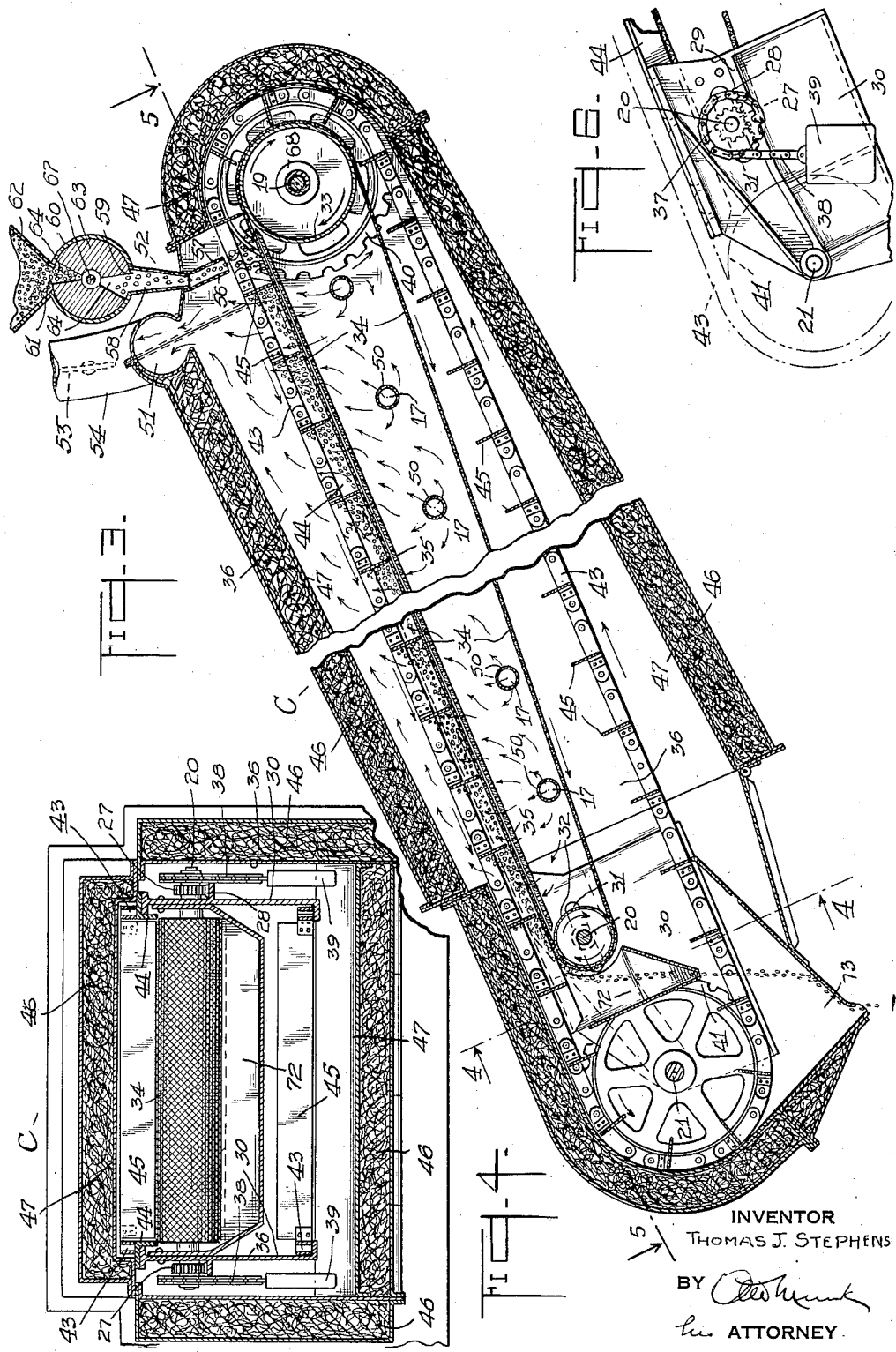
INVENTOR
Thomas J. Stephens
BY
ATTORNEY Nov. 27, 1945.  T. J. STEPHENS  2,389,650
APPARATUS FOR ROASTING COFFEE AND THE LIKE
Filed Aug. 7, 1942  4 Sheets-Sheet 4
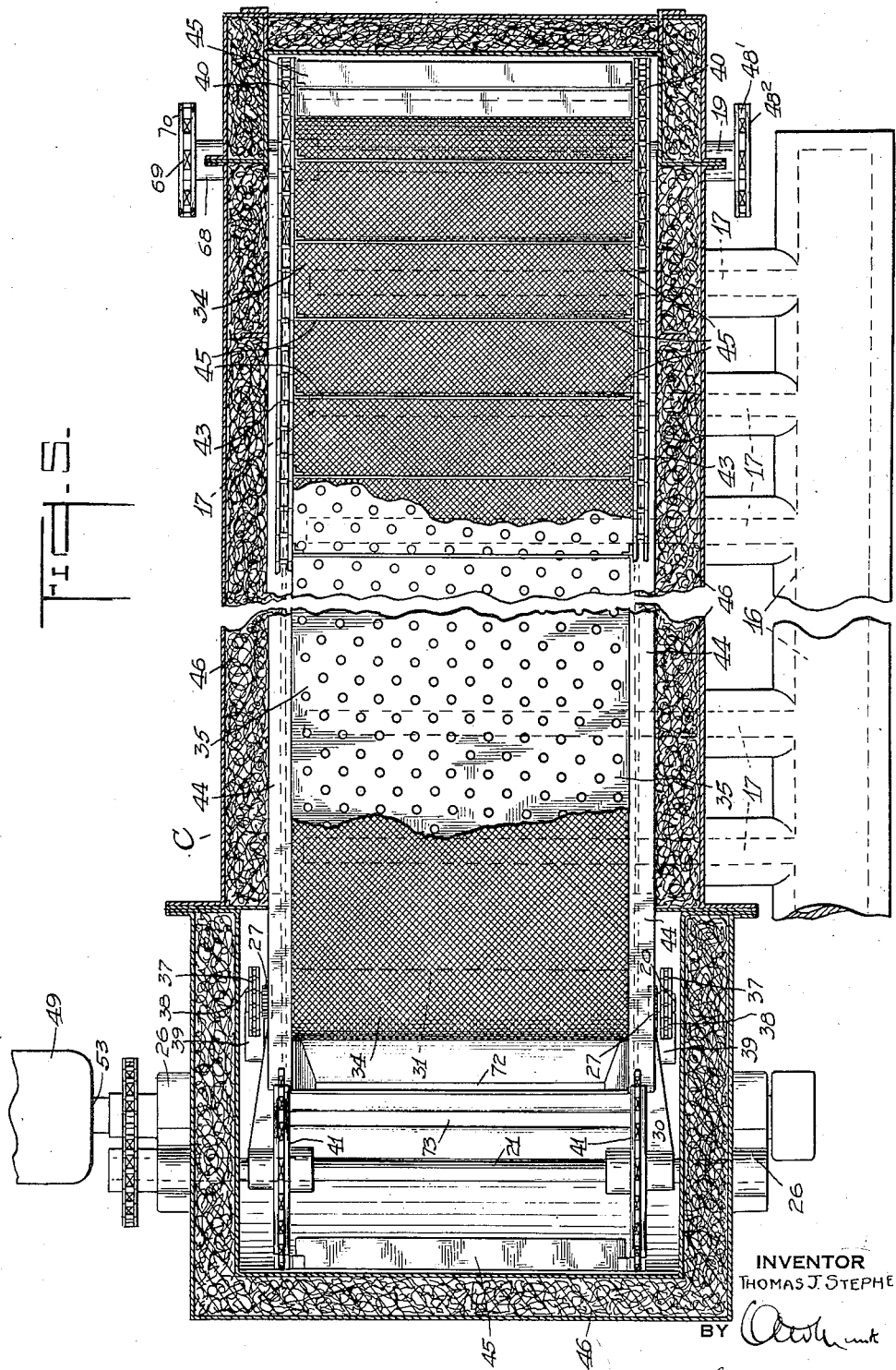
INVENTOR
THOMAS J. STEPHENS
BY
his ATTORNEY Patented Nov. 27, 1945

2,389,650

UNITED STATES PATENT OFFICE 2,389,650

APPARATUS FOR ROASTING COFFEE AND THE LIKE

Thomas J. Stephens, New York, N. Y., assignor to Frederick W. Ludwig, as trustee for the benefit of Thomas J. Stephens, Henry A. Rudkin, and Frederick W. Ludwig Application August 7, 1942, Serial No. 454,062

10 Claims. (Cl. 34—67)

This invention relates broadly to apparatus for roasting coffee, nuts, beans, grains and the like, and has reference particularly to a mechanical thermal equipment, by means of which to practice a roasting process forming the subject matter of my copending application for Letters Patent filed September 16, 1941, Serial Number 410,984.

My invention has for its object to provide a roasting apparatus of the character which comprises certain novel arrangements and combinations of parts hereinafter described in the specification, set forth in the appended claims and illustratively exemplified in the accompanying drawings, in which:

Figure 1 is a side elevational view of a complete roasting and cooling plant;

Figure 2 is a side elevational view of the roaster;

Figure 3 is a substantially longitudinal sectional view of the roaster;

Figure 4 is a substantially transverse sectional view of the roaster taken on lines 4—4 of Figure 3;

Figure 5 is a substantially longitudinal sectional view taken on lines 5—5 of Figure 3;

Figure 6 is a detail elevational view of the supporting bracket for the delivery end of the conveyors of the roasting unit;

Figure 7 is a top plan view of the cooling unit; and

Figure 8 is a substantially transverse sectional view of the cooling unit taken on lines 8—8 of Figure 7.

Referring to the drawings, A denotes the steam generator having the usual steam pressure gauge 10 and steam dome 11. Leading from the steam dome 11 is a steam conduit 12 provided with a valve 13 and governor 14, the conduit 12 leading to a super-heater B. A conduit 15 connects the super-heater B with a manifold distributor 16 from which a plurality of spaced pipes 17, in the form of lateral extensions of the manifold, project into a roasting unit C. A suitable temperature controlling means 18 is arranged in the manifold 16.

The roasting unit in the present embodiment comprises three shafts 19, 20 and 21 (see Fig. 2) disposed in parallel relation to each other, shaft 19 being at the receiving and upper end of the unit, while shaft 21 is at the delivery or lower end, the shaft 20 being adjacent the shaft 21 at the delivery end. The shaft 19 is journalled in bearings 22 which are mounted on the cross beams 23 of a super-structure or tower 24. The lower shaft 21 is journalled in bearings 25 of supporting standards 26. Shaft 20 is fitted at each of its ends with a pinion 27 (Fig. 6). Each of said pinions 27, respectively, engages in meshed relation with an underlying rack 28, both said racks being aligned in co-incidence with planes perpendicular to the axis of shaft 19. The racks 28 are supported by a flange 29 of the casting 30, which is provided with elongated openings 31 through which the shaft 20 extends. A pulley 33 is keyed to shaft 19 and is centrally disposed between the bearings 22. A pulley 32 is rotatably mounted on shaft 20, centrally disposed between the pinions 27. An endless woven wire band 34 movably embraces pulleys 32 and 33. A metal plate 35, distributively perforated throughout its entire area, is disposed in such position as to form a support for the upper lead of the band 34, said plate 35 extending from lines short of contact with the peripheries of pulleys 32 and 33, respectively, and transversely between the two vertical side walls 36 of a housing forming the roasting chamber of the device. Shaft 20 is provided at each of its ends, exteriorly of the said pinions, with a sprocket 37. An end of a sprocket chain 38 is fixed to the periphery of each of said sprockets 37. The point of engagement of each chain 38 to each sprocket 37 is at the bottom of the sprocket. Each chain 38 partially encircles its respective sprocket from the point of engagement, in the direction opposite to that of the movement of the woven wire band 34 and depends tangentially to a plane somewhat below the lower periphery of the sprocket 37. A weight 39 is attached to the depending end of each sprocket chain 38. The effect of the weights, so attached, is to tend to rotate shaft 20, whereby the pinions 27 are caused to travel along their respective racks 28 to move pulley 32 away from pulley 33, whereby to maintain tension on the woven wire band 34 under varying expansions thereof, due to temperature.

Two sprockets 40 are rotatably mounted on shaft 19 and disposed in slightly spaced relation to the respective ends of pulley 33. Two corresponding sprockets 41, identical with sprockets 40, are mounted in fixed relation to shaft 21 and in aligned relation, respectively, to sprockets 40. An endless link sprocket chain 43 engages each respectively aligned pair of sprockets 40 and 41. The upper leads of the sprocket chains 43 are slidably supported, between their points of contact with the sprockets by inclined angle bars 44 for the purpose of maintaining definite and uniform space between the band 34 and said chains 43. The angle bars 44 comprise an element of the structural support of tower 24 of the mechanical apparatus. The upper lead of the band 34 is maintained in parallel relation to the upper leads of the sprocket chains 43 and all incline from the level or horizontal plane by an angle of approximately 24°. At longitudinal intervals of about 12 inches, more or less, transverse flights 45 are fixed, at their respective ends, to the sprocket chains 43 in such manner that they depend from the upper leads of said chains to lines just short of contact with the woven wire band 34.

The entire mechanical assembly is housed by heat resistant walls 46. The vertical side walls 36 are closely adjacent the sprocket chains 43 and woven wire band 34. The upper and lower walls 47 of the housing are more remotely placed to provide flow way above and space for the chains 43 to sag beneath. The arcuate ends of the housing are closely placed to the sprockets 40, 41, chains 43 and flights 45, to prevent flow way around the ends. The arcuate ends of the housing are preferably made removable to afford access to the sprockets 40, 41 and chains 43. The shafts 19 and 21 extend through the wide walls 36 of the housing and are connected to prime movers 48 and 49, respectively, located exteriorly of the housing (see Figs. 2 and 5).

The perforated lateral pipes 17 extend through one vertical side wall 36 of the housing, the ends of said pipes being closed but the aggregate area of the distributed perforations 50 through the side walls of each is approximately equal to the interior area of the respective pipes, preferably somewhat less. The pipes 17 each communicates, through the controlling means 18, with the source B of super heated gas under pressure, preferably steam.

One end of shaft 19 is connected to the prime mover 48, preferably an electric motor, by means of a sprocket 48' and chain 48² in such manner as to cause uniform rotation of said shaft at a specified rate of speed and in the direction to cause the woven wire band 34 to flow onto the upper periphery of pulley 33 which is keyed to said shaft. One end of shaft 21 is connected to the prime mover 49, preferably an electric motor in such manner as to cause uniform rotation of said shaft at a predetermined speed and in the direction to cause the sprocket chains to travel onto the upper periphery of the sprockets 41. By this arrangement the upper lead of the woven wire band 34 will travel up the incline, while the flights 45, immediately above said band 34, are travelling down the incline.

When the equipment is used for roasting coffee, or other physically similar materials, the speed of the woven wire band 34 should be about 20-30 feet per minute. At this rate of speed the woven wire band 34 will drag any such granular material, resting upon it, upward on an incline of 24°, and such upward travel of the granular material will be intercepted by each transverse flight 45, causing the material to bank against the flight, overturn and cause the upper portion of the mass to flow down, by means of which its granules are continuously intercommingled.

An exhaust manifold 51 is provided at the extreme upper portion of the housing, through which to exhaust or withdraw spent gases of the heat vehicle admitted through pipes 17 beneath the perforated plate 35.

A function of the perforated plate 35 is to cause distributive uniformity of flow of the gaseous heat vehicle, through the intercommingling material carried upon the woven wire band 34. A function of the flights 45 is to limit the time interval during which such flow of the gaseous heat vehicle continues through the respective masses of material to be roasted. For example, if the roasting interval is 4 minutes, each flight 45 should pass from a feeder 52 at the upper end of the incline to the vertical axial plane of shaft 20 in exactly 4 minutes. The shaft 21 is driven by means of an adjustable variable speed drive 53, of a type such that the rate of travel of the chains 43 and flight assembly 45 can be adjusted to any desired speed within a predetermined range, whereby the time interval of heat application to the roasting material can be selectively established and continuously maintained.

For the purpose of establishing and continuously maintaining uniform rate of flow of the gaseous heat vehicle through the roasting material an appropriate exhauster may be connected to the manifold 51. The exhauster may be a mechanically operated exhaust fan or a draft inducing chimney 54. In the case of the latter, the communicating duct between manifold 51 and said chimney should be provided with a regulating damper 55.

Two parallel plates 56 and 57 depend from the upper side of the housing in such position as to comprise a transverse chute through which to feed material to be roasted on to the woven wire band 34. The position of said chute is preferably slightly below that of the projection of a vertical plane passing through the axis of shaft 19. A second vertically extending chute 58 communicates at its lower end with chute 56—57 and at its upper end with a longitudinally extending opening 59 in the bottom of a cylinder 60. A corresponding longitudinal opening 61 in the top of cylinder 60 communicates with a hopper 62. Cylinder 60 is fitted with a rotatable valve 63, having segmental cavities or pockets 64 extending its entire length, whereby, when rotated, said pockets 64 will be filled by gravity from the hopper 62 and emptied by gravity through chute 58 and passage 56—57 to be distributed transversely across the woven wire band 34.

Cylinder 60 is provided with heads 65 at its opposite ends in which bearings 66 are formed to carry a shaft 67 supporting the valve 63. The length of the valve 63 may be equivalent to the width of the band 34 and the corresponding dimensions of chutes 58 and passage 56—57 should be equivalent to the length of the valve 63.

Since the rate of travel of the chains and flight assembly 45 determines the quantitative capacity at which roasting proceeds, it is expedient to synchronize the rate of feed therewith. To accomplish this the hub 68 of the sprocket 40 is elongated to extend through the side of the housing 36 and is fitted with a sprocket 69 carrying a sprocket chain 70 in cooperation with a second sprocket 71 mounted upon an extended end of shaft 67. The relative diameters of the said sprockets 69 and 71 is such as to result in a discharge of the valve 63 into each intermediate space between flights 45. This arrangement results in a uniform quantity of material to be roasted being fed into each of the intermediate spaces between the flights 45, and in each charge so fed, being distributed transversely across the band 34. As each such charge or mass of coffee, or other material, is carried down the incline by a flight 45 while at the same time it is being borne up the incline by the band 34, upon which it rests, the constituent granules of each such mass will be continuously intercommingled by the opposing action of the flight 45 travelling in one direction and the band 34 beneath travelling in the opposite direction. Accordingly, such overturn and intercommingling will be approximately identical with respect to the several masses in transit through the equipment. Under such conditions each mass of coffee will present the same resistance to the passage of the gaseous heat vehicle therethrough as that of each other mass. Therefore, each intercommingling mass will be subjected to the same quantitative heat application.

The temperature of the gaseous heat vehicle, the quantity thereof, the rate of travel of the flights 45 and the volumetric capacity of the feeder 64 may be correlated to result in completing any desired degree of roast of the material when it reaches the position of a vertical plane passing through the axis of shaft 20. As the material being roasted passes the position of an upward projection of the vertical axial plane of shaft 20 it will gravitate from the band 34 into the hopper 72, thence to the hopper 73 from which it will be distributed by gravity on the cooling band 74.

The cooling band 74 comprises a continuous woven wire conveyor supported at opposite ends on pulleys 75 and 76, at an inclination approximately that of the band 34. The material enters the cooling unit D by falling into an opening 77 formed by upstanding front and side walls and a triangular shaped baffle wall 78 having its base anchored in the side walls and its tip in the center of the conveyor 74, as illustrated in Figure 7. The under side of the baffle wall 78 is spaced above the band to allow the material to pass thereunder.

The side walls 79 of the unit are disposed above the band 74 and at their opposite upper edges are mounted a plurality of spaced bridge bars 80. Depending from the bars 80 are spaced triangular baffles 81 each thereof being a piece of angle material projecting to an elevation slightly above the upper lead of the band 74 and being disposed with their angles pointed in the direction of the opening 77 and opposite to the direction of movement of the upper lead of the band. The bottom wall 82 of the cooling unit is V-shaped and the end walls 82' are semi-cylindrical and project about the pulleys 75 and 76. The material falling upon the band 74 is prevented from being crowded over the forward pulley 75 by an inclined plate 83 projecting between the side walls in advance of the baffle 78. As the material falls from the band 74 turning about its upper end pulley 76, it enters a chute 84 formed by the curved end wall 82' and a depending wall 85 running from the lower peripheral surface of the band passing about the pulley 76. The bottom wall 82 joins the wall 85 about midway of its height, as shown in Figure 1. The shaft of motor speed reduction mechanism 53 is a continuation of the shaft 86 of pulley 75 so as to impart movement to the band 74 in accordance with the movement of the conveyors of the roasting unit. An air exhaust outlet 87 is disposed in the side wall 79 and connects through a pipe 88 with an exhaust fan unit 89, whereby air is drawn through the material on the band 74, through the latter and into the chamber in the cooling unit and thence through the outlet 87 to the exhaust unit 89.

The material after completing its roasting operation falls upon the band 74 at its lower end and travels with the upper lead of the latter in an upwardly inclined direction, as illustrated by the arrow 90 in Figure 1, until it reaches the discharge end where it falls through the chute 84 into a bin or other awaiting receptacle.

Having described my invention and the manner in which the same is used, what I claim and desire to secure by Letters Patent is:

1. An apparatus for roasting granular materials such as coffee, nuts, beans or grains, comprising an endless woven wire band, pulleys supporting said band in an inclined position, means for feeding granular material onto said band at its upper limit, means for rotating one of said pulleys in a direction to cause the upper run of said band to travel upwardly of said incline, a series of mutually spaced transverse flights, means for causing said flights to travel in proximity to the upper run of said band and in a direction downwardly of said incline, each of said flights including a substantially rigid element of a width, height and solidity to force any granular material disposed on said band in front of such element downwardly of said incline for discharge from said band to the lower end of said upper run, and means for applying heat to granular material carried upon said band.

2. An apparatus for roasting granular material such as coffee, nuts, beans or grains, comprising an endless pervious band, pulleys supporting said band in an inclined position, means for rotating one of said pulleys in a direction to cause the upper run of said band to travel upwardly of said incline, means for feeding granular material upon said band at its upper limit, transverse flights coupled with means for causing said flights to travel in a direction downwardly of said incline and in proximity to the upper run of said band, each of said flights including a substantially rigid element of a width, height and solidity to force any granular material disposed on said band in front of such element downwardly of said incline for discharge from said band at the lower end of said upper run and to cause intercommingling of the granular material during its downward movement over said band, and means for passing a gaseous heat vehicle through said band and through said granular material while being intercommingled upon said band.

3. An apparatus for roasting granular material such as coffee, nuts, beans or grains, comprising in combination two pulleys rotatably supported at different levels, an endless pervious band embracing said pulleys and supported thereby with its suspended runs in an inclined position, means for rotating one of said pulleys in the direction to cause the upper run of said band to travel upwardly of its incline, equidistantly spaced transverse flights and means for causing said flights to travel downwardly of said incline in proximity to the upper face of said band, each of said flights including a substantially rigid element of a width, height and solidity to force any granular material disposed on said band in front of such element downwardly of said incline, means for disposing an equivalent mass of the granular material to be roasted upon said band in each intermediate space between said flights, means for distributively passing heat-laden gases simultaneousely through all of said masses of granular material, and means for discharging each of said masses of said material at the expiration of a predetermined time interval after its disposition upon said band.

4. An apparatus for roasting granular materials such as coffee, nuts, beans or grains, comprising in combination two pulleys rotatably supported at different levels, an endless pervious band embracing said pulleys and supported thereby with its suspended runs in an inclined position, means for rotating one of said pulleys in the direction to cause the upper run of said band to travel upwardly of its incline, equidistantly spaced transverse flights and means for causing said flights to travel in proximity to the upper face of said band and downwardly of said incline, each of said flights including a substantially rigid element of a width, height and solidity to force any granular material disposed on said band in front of such element downwardly of said incline, means for feeding a predetermined quantity of granular material to be roasted upon said band at its upper limit and in each space between said flights, means for distributively passing heat-laden gases in equivalent measure through each of said masses of material continuously during their transmit upon said band, and means for automatically discharging each of said masses from said band at the expiration of a predetermined time interval after being fed thereupon.

5. An apparatus for roasting granular materials such as coffee, nuts, beans or grains, comprising in combination two pulleys rotatably supported at different levels, an endless pervious band embracing said pulleys and supported thereby with its suspended runs in an inclined position, means for rotating one of said pulleys in the direction to cause the upper run of said band to travel upwardly of its incline, equidistantly spaced transverse flights and means for causing said flights to travel in proximity to the upper face of said band and downwardly of said incline, each of said flights including a substantially rigid element of a width, height and solidity to force any granular material disposed on said band in front of such element downwardly of said incline, means for feeding a predetermined quantity of granular material to be roasted upon said band at its upper limit and in each space between said flights, means for distributively passing heat-laden gases in equivalent measure through each of said masses of material continuously during their transit upon said band, means for automatically discharging each of said masses from said band at the expiration of a predetermined time interval after being fed thereupon, and means for immediately withdrawing heat from said discharged material.

6. Continuous, automatic apparatus for roasting granular materials such as coffee, nuts, beans or grains, comprising in combination two pulleys rotatably supported at different levels, a pervious endless band embracing said pulleys and supported thereby with its upper run approximately planar and inclined from horizontal by approximately 24°, means for rotating one of said pulleys in the direction to cause the upper run of said band to travel upwardly of said incline, transverse flights in the form of substantially rectangular planar plates uniformly disposed at spaced intervals and in approximately perpendicular relation to the upper surface of said band, said plates being of sufficient width, height and rigidity to completely intercept granular material carried upwardly upon said band, means for automatically feeding a predetermined quantity of granular material to be roasted upon said band near its upper limit and between adjacent flights, means for continuously moving said flights at a predetermined uniform speed downwardly of said incline and in close proximity to the upper surface of said band so as to force the granular material disposed on said band in front of each such flight downwardly of said incline for automatic discharge from said band at the lower end of said upper run and to cause the granules of said material to be continuously intercommingled during their downward travel over said band, means for synchronizing the speed of said feeding means with the speed of movement of the downwardly moving flights, and automatic means for progressively applying heat at a predetermined quantitative rate to said material during its travel over said band.

7. In a roasting apparatus of the character described, the combination of a roasting chamber, a pair of axially horizontal pulleys spaced from each other and rotatably supported at different levels within the chamber, an inclined continuous endless band embracing said pulleys and supported thereby, said band being pervious to the passage of a gaseous heat vehicle therethrough, means for rotating one of said pulleys in the direction to cause the upper run of said band to travel upwardly of said incline, a series of equidistantly spaced flights in the form of substantially rectangular planar plates, means for supporting, moving and guiding said flights over the upper run of said band in close perpendicular proximity to its upper surface and in the direction opposite to that of the movement of said upper run, said plates being of sufficient width, height and rigidity to force any granular material disposed on said band in front of any such plate downwardly of said upper run of said band, means for feeding a predetermined quantity of granular material upon said band between adjacent flights, means for introducing a gaseous heat vehicle into the roasting chamber and distributively forcing it through said band into contact with the granular material supported thereon, and means for automatically discharging the granular material from said band at the expiration of a predetermined time interval after feeding thereof.

8. A roasting apparatus, as claimed in claim 7, in which the continuous band is an endless woven wire band and the means for distributing the gaseous heat vehicle through said band and into contact with the material carried thereon comprises a fixed planar plate distributively perforated and disposed in such inclined position that the lower surface of the upper run of said band coincides with the upper surface of said perforated plate and slides thereon.

9. The combination of a roasting apparatus, as claimed in claim 7, with a cooling device, comprising a pair of spaced axially horizontal pulleys, an endless conveyor band embracing said pulleys, means for rotating one of said last mentioned pulleys to move said conveyor band, said conveyor band being disposed in position to receive at one of its pulleys roasted material being discharged from said roasting apparatus and to convey said material to a point beyond its other pulley, said last mentioned conveyor band being pervious to the passage of a gaseous cooling medium therethrough but impervious to the passage therethrough of the granular material to be cooled, and means for passing air through said last mentioned conveyor band and through the granular material distributed thereupon and thence to a remote exhaust point.

10. A roasting apparatus as claimed in claim 7, in combination with a cooling device, comprising a pair of spaced axially horizontal pulleys, an endless conveyor band embracing said pulleys, means for rotating one of said last mentioned pulleys to move said conveyor band, said conveyor band being disposed in position to receive at one of its pulleys roasted material being discharged from said roasting apparatus and to convey said material to a point beyond its other pulley, said last mentioned conveyor band being pervious to the passage of a gaseous cooling medium therethrough but impervious to the passage therethrough of the granular material to be cooled, means for passing air through said last mentioned conveyor band and through the granular material distributed thereupon and thence to a remote exhaust point, and mixing means disposed along the continuous conveyor band of the cooling device and in the path of the material being conveyed and cooled.

THOMAS J. STEPHENS.